United States Patent [19]

Cretzmeyer et al.

[11] Patent Number: 5,173,375
[45] Date of Patent: Dec. 22, 1992

[54] ELECTROCHEMICAL CELL WITH IMPROVED FILL PORT

[75] Inventors: John W. Cretzmeyer, Richfield; John C. Strohkirch, Coon Rapids, both of Minn.

[73] Assignee: Medtronic, Inc., Minneapolis, Minn.

[21] Appl. No.: 627,172

[22] Filed: Dec. 14, 1990

[51] Int. Cl.$^5$ .............................................. H01M 2/08
[52] U.S. Cl. ........................................ 429/72; 427/90; 427/185
[58] Field of Search .................. 429/72, 82, 174, 180, 429/185

[56] References Cited

U.S. PATENT DOCUMENTS

| | | |
|---|---|---|
| 3,804,671 | 4/1974 | Rosansky ................................. 136/6 |
| 4,105,833 | 8/1978 | Greatbatch et al. . |
| 4,118,550 | 10/1978 | Koch . |
| 4,132,836 | 1/1979 | Greatbatch . |
| 4,135,519 | 1/1979 | Greatbatch . |
| 4,166,887 | 9/1979 | Mueller et al. . |
| 4,211,832 | 7/1980 | Mueller et al. . |
| 4,360,573 | 11/1982 | Rao et al. . |
| 4,398,346 | 8/1983 | Underhill et al. .................. 29/623.5 |
| 4,611,395 | 9/1986 | Phillips et al. . |
| 4,683,647 | 8/1987 | Brecht et al. ..................... 429/185 X |
| 4,748,094 | 5/1988 | Howard et al. . |
| 4,770,957 | 9/1988 | Miyagawa ........................... 429/175 |
| 4,913,986 | 4/1990 | Howard et al. ........................ 429/90 |

OTHER PUBLICATIONS

Patent Abstracts of Japan, vol. 10, No. 209, E421, Abstract of JP 61-49369, Published Mar. 11, 1986 for Furukawa Battery Co. Ltd.

Primary Examiner—Anthony Skapars
Attorney, Agent, or Firm—Harold R. Patton; Daniel W. Latham

[57] ABSTRACT

One-piece electrochemical cell cover with improved seal area in the fill port. The fill port comprises a countersunk area and an integral boss formed directly underneath the countersunk area.

8 Claims, 1 Drawing Sheet

ELECTROCHEMICAL CELL WITH IMPROVED FILL PORT

BACKGROUND

This invention relates to electrochemical cells of improved construction. Specifically, it is concerned with cells having an improved seal in the fill opening of the cell container. The fill opening is utilized for the introduction of cell components into the cell container. It is sometimes also referred to as a "fill port".

With the advent of high energy density nonaqueous cells generally utilizing fluid components such as thionyl chloride and sulphur dioxide depolarizers and various reactive organic electrolyte solvents, the design and sealing of the fill opening in such cells has become increasingly important. For purposes of this invention, the term "fluid" is meant to describe any component capable of flowing through a fill port and into a cell container. In most instances, the component will be a liquid, including solutions.

It should be understood that, if a fluid component is used in accordance with this invention, it need be in fluid form only at the time of its introduction into the cell container. Thereafter, it may solidify or assume any other form as required by the particular cell involved.

Electrochemical cells such as rechargeable lithium cells having a liquid electrolyte and incorporating various components may make use of the invention. For example, see U.S. Pat. Nos. 4,118,550 and 3,998,658 for cells of this type. The following listed U.S. patents show various lithium-halogen batteries or cells of another type making use of cell containers in which a fluid component is introduced in the container through a fill opening: U.S. Pat. Nos. 4,105,833; 4,135,519; 4,132,836; 4,166,887; 4,211,832; 4,360,573; 4,611,395, and 4,748,094. These cells may also make use of this invention. All of these patents are incorporated herein by reference.

In such cells it is important to assure hermetic sealing of the fill port. It is also important to provide means for assuring that a hermetic seal has been completed upon sealing the fill port. The contents of such cells typically may consist of high energy corrosive materials such as lithium anodes, carbon current collectors and liquid thionyl chloride cathode/electrolytes and the like. Other such cells may include lithium anodes, organic solvent electrolytes such as propylene carbonate containing a dissolved salt such as lithium perchlorate for enhanced conductivity, and solid cathode materials such as manganese dioxide, vanadium pentoxide or carbon monoflouride. Other such cells may contain cathode depolarizer materials such as organic-iodine charge transfer complex compounds.

Such cells are usually encapsulated in a metal container which, as already stated, includes a fill port. Stainless steel is the metal most commonly used. Following placement of mechanical parts and any solid chemical constituents in the container, the container is then closed with a container cover. Typically the fill port is located in the cover. The container is then filled with any liquid or liquid-like battery constituents, such as fluid cathode/electrolytes in the case of thionyl chloride batteries or molten charge transfer complex in the case of iodine batteries, by pouring same into the cell container through the fill port. The fill port is then closed and sealed.

The hermeticity or perfection of seal at the fill port is an important feature, particularly in such high reliability cells. It is also important that the seal be amenable to testing in order to ascertain and demonstrate that a high degree of hermeticity has been achieved.

A seal arrangement for this purpose which has been used extensively comprises a double seal arrangement having inner and outer seals in the fill port with an intermediate space therebetween containing a means such as glass bubbles for holding a test gas used in testing the outer seal for hermeticity. Such an arrangement facilitates the hermetic testing of the outer seal thereby providing a basis for a high degree of confidence in its hermeticity.

SUMMARY OF THE INVENTION

The invention comprises an improved fill port, typically located in the container cover which may be of stainless steel, titanium or other suitable metal, and is preferably blanked as one piece. A novel feature comprises the fill port having a countersunk area with an amount of metal extruded at the bottom of the port equal to the thickness of the metal in which the port is located. A fill port punched through such a countersunk area has a seal area at least equal in thickness to the original material.

It should be understood that the terms "countersunk", "countersink" and the like as used herein are intended to broadly include within their meaning all similar openings e.g., counterbores, punched holes, countersink holes, drilled holes, etc.

The invention consequently provides adequate seal area in the countersunk fill port providing more contact seal area for the inner and outer seal means and the intermediate test gas absorbent. After the cell has been filled with electrolyte or depolarizer, a plug of metal or preferably plastic is pressed into the punched hole fill port to a depth below the countersunk area sufficient to allow the addition of small amounts of glass bubbles used as helium absorbents for leak checking. The glass bubbles are then added and the outer seal, preferably in the form of a closing button, is inserted into the countersink and welded therein.

The method of producing the extruded, lengthened sealed area preferably in a one-piece cover, is a new improvement which obviates the necessity for an additional part and a separate weld procedure. See for example U.S. Pat. No. 4,748,094. It is preferably done in one operation as part of a stamping procedure.

DESCRIPTION OF THE PREFERRED EMBODIMENT

Figure 1:
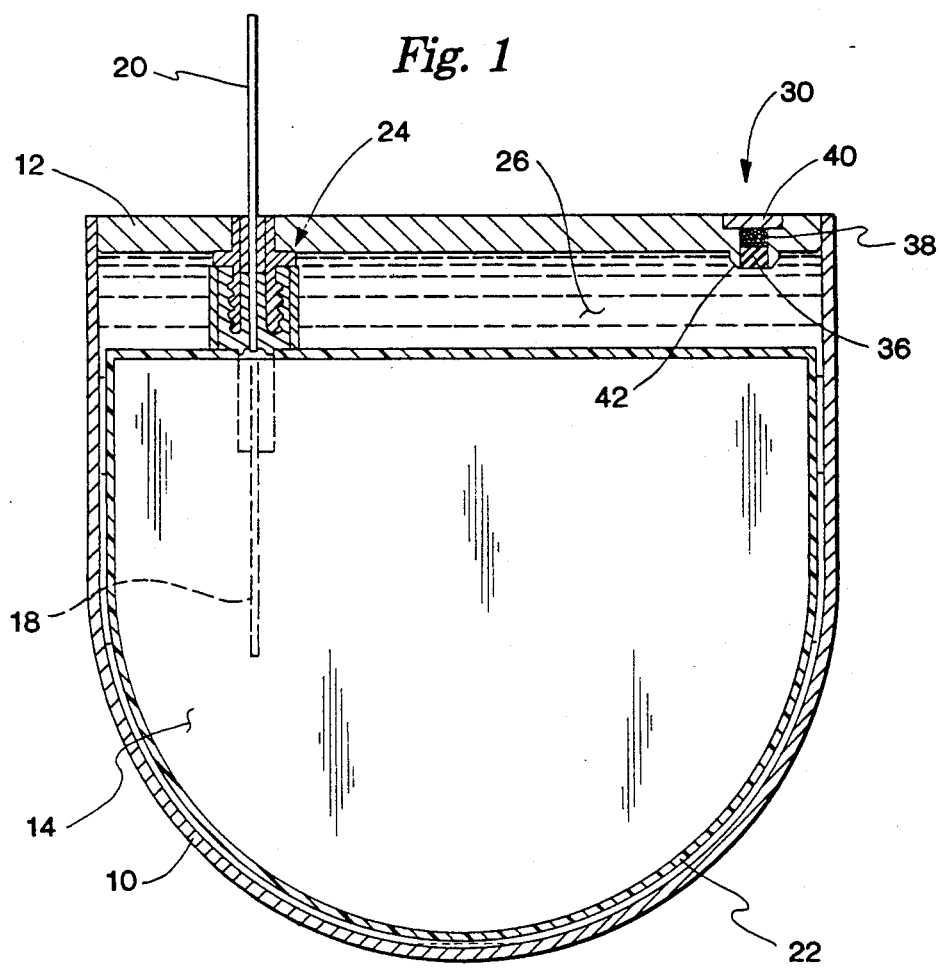
FIG. 1 is a side elevational view in section showing an electrochemical cell including an improved seal arrangement of the invention located in the container cover.

Referring now to FIG. 1, a hermetically sealed electrochemical cell is illustrated showing a preferred form of the fill/seal arrangement of the invention. The cell comprises a container 10 of metal such as stainless steel.

Container 10 has an open top or end which is closed by means of a cover 12, also of stainless steel. Cover 12 is welded to container 10. The cell also includes anode means, in this particular case comprising a lithium element 14 and an imbedded anode current collector element 18, which may take the form of a pin 20 as shown. Pin 20-18 functions both as an electrical lead and anode current collector. Typically, the pin may be stainless steel, nickel or zirconium. Anode 14 may be supported within a surrounding frame member 22 of plastic. Typically, the plastic Halar is used for this purpose. Electrode lead pin 20-18 is carried by a feedthrough assembly 24 as is typical in this art. Feedthrough assembly 24 provides a protective sheath which surrounds lead pin 20-18 and is, in addition to being a non-conductor of electricity, also non-reactive with the contents of the cell. Materials utilized in such a feedthrough assembly will include glass and fluoropolymers such as Halar and the like. Other nonreactive electrical insulating materials may be used. "Halar" is a trademark of the Allied Chemical Company.

Figure 2:
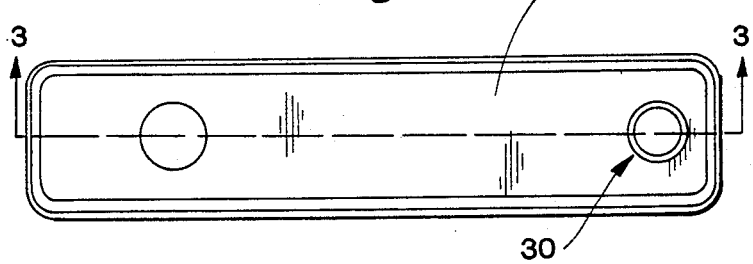
FIG. 2 is a top elevational view of the container cover of the electrochemical cell shown in FIG. 1, showing the fill port therein. 35
Figure 3:
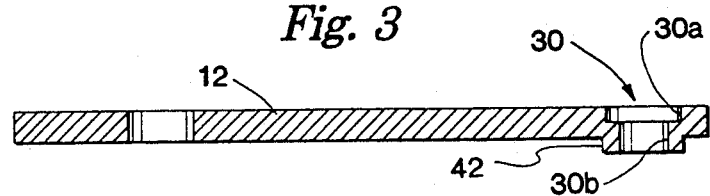
FIG. 3 is a cross-section along line 3—3 of FIG. 2 showing the cell cover in more detail with respect to the fill port seal arrangement of the invention.

Referring now more particularly to FIGS. 2 and 3 in addition to FIG. 1, the improved fill port and seal area of the invention will be described. Typically, cover 12 is stamped from stainless steel such as 0.048" thick blank stock. Unfortunately, with ordinary stamping, it has been determined that such stock does not provide sufficient depth to the fill port seal area to provide sufficient volume for a closing button 40, glass bubbles 38 and inner plug 36 (see FIG. 1), all of which are necessary to allow for helium hermeticity testing. In accordance with the invention, it has been determined that adequate seal area and volume can be obtained by a design modification in which a "countersink" 30a is stamped or otherwise formed into cover 12 above the ultimate location of fill port passage 30b (see FIG. 3) and the metal that is moved upon stamping is allowed to flow and protrude on the underside of the cover toward the container interior to form a boss 42 (best seen in FIG. 3). A hole 30b smaller in diameter than the countersunk stamped opening may then be pierced or drilled through the boss to receive the inner plug 36 and the glass bubbles 38 as is shown in FIG. 1. Preferably, the stamping operation will provide a boss 42 having a thickness at least equal to the thickness of the original blank material. There is thus provided in the most prefered embodiment of the invention a one-piece cover having a seal area of appropriate size and volume for receiving the seal elements therein as described in detail below. The fill port can be located in any other selected portion of the container, if desired.

The cover can be stamped in one operation with the possible exception of the passage 30b through boss 42, which may need to be drilled in a secondary operation. Instead of stamping the cover it may be machined as one piece with a integrally machined boss portion 42, if desired.

In assembly, the anode assembly comprising the lithium element 14 and lead pin current collector 20-18 is preferably fitted within container 10 as shown in FIG. 1 with the anode surfaces spaced from the inner surface of the container so as to guard against contact between the anode and the container interior.

In the particular embodiment illustrated container 10, being of electrically conducting material, serves as a cathode current collector in direct contact with the cathode material which is ultimately poured into container 10. Consequently, an electrical lead (not shown) may be attached directly to the exterior of container 10 for cathodic contact and electrical connection.

Upon positioning of the anode assembly within container 10, cover 12 may then be placed in a position of closure with respect to container 10 and welded thereto. Electrolyte material 26, such as a molten iodine polymer complex or other liquid electrolyte material may be then be poured through a fill port or opening generally indicated at 30 in cover 12 (best seen in FIG. 3) to fill container 10.

In accordance with present practice, a fill port seal and closure arrangement construction is then utilized to close fill port 30. Such a typical construction is shown in FIG. 1 and includes a polymeric inner plug 36. Inner plug 36 is preferably made of a compressible body of a suitable non-reactive polymeric material (to the system involved) such as polytetrafluoroethylene (PTFE) or other suitable fluoropolymer. Typically, polypropylene, polyethylene and other such polymeric materials which are non-reactive to the system may also be used. Plug 36 may also be of metal if desired. Such an inner seal need not be highly hermetic but the more hermetic it is the better. Only the outer seal must be reliably hermetic.

Following placement of inner seal 36, a helium-holding material 38 or other test gas absorbing material is placed within the fill port passage. This material may take various forms. Glass beads such as those obtained from 3M Co. are preferred. Ceramics or a Teflon disc may be used as well. The glass beads are more fully described in the aforementioned U.S. Pat. No. 4,748,094.

After placement of the test gas holding material 38, the top of the fill port is hermetically sealed by placement of a metal closure button 40 which is welded into place in the countersunk area 30a. The object of the formation of the outer seal at the top of the fill port is to provide a hermetic seal which can be tested for hermeticity as is described in detail in the above referenced U.S. Pat. No. 4,748,094.

Having described the invention by way of illustration, the exclusive property rights therein are defined by the following claims.

What is claimed is:

1. An electrochemical cell having a countersunk fill port and seal comprising:
   a metal container portion having an exterior surface and an interior surface;
   a countersunk area formed in the exterior surface;
   an integral boss formed on the interior surface directly underneath the countersunk area;
   a passage extending from the countersunk area through the boss, the passage of lesser diameter than the countersunk area;
   a plug sealing the passage; and
   a closure button in the countersunk area in sealing engagement with the countersunk area.

2. An electrochemical cell comprising:
   a container and a metal cover closing the container, the cover having a top surface and a bottom surface;
   a countersunk area formed in the top surface;
   an integral boss formed on the bottom surface directly underneath the countersunk area, and a passage extending through the cover from the countersunk area through the boss, said passage of lesser diameter than the countersunk area;
   a plug sealing the bottom portion of the passage;

a gas absorbing material in the passage over the plug; and a closure button in the countersunk area sealing the passage over the gas absorbing material.

3. The combination of claim 2 wherein the passage is of lesser diameter than the countersunk area.

4. The electrochemical cell of claim 1 wherein the sealing by the plug is provided by a press fit.

5. The electrochemical cell of claim 1 wherein the sealing by the closure button is provided by a weld.

6. The electrochemical cell of claim 1 wherein the fill port also includes a gas absorbent material in the passageway and confined between the plug and closure button.

7. The electrochemical cell of claim 2 wherein the sealing by the plug is provided by a press fit.

8. The electrochemical cell of claim 2 wherein the sealing by the closure button is provided by a weld.

* * * * *